G. W. FLETCHER.
AUTOMATIC HOG AND STOCK WATERING DEVICE.
APPLICATION FILED MAY 11, 1910.
1,025,461.
Patented May 7, 1912.
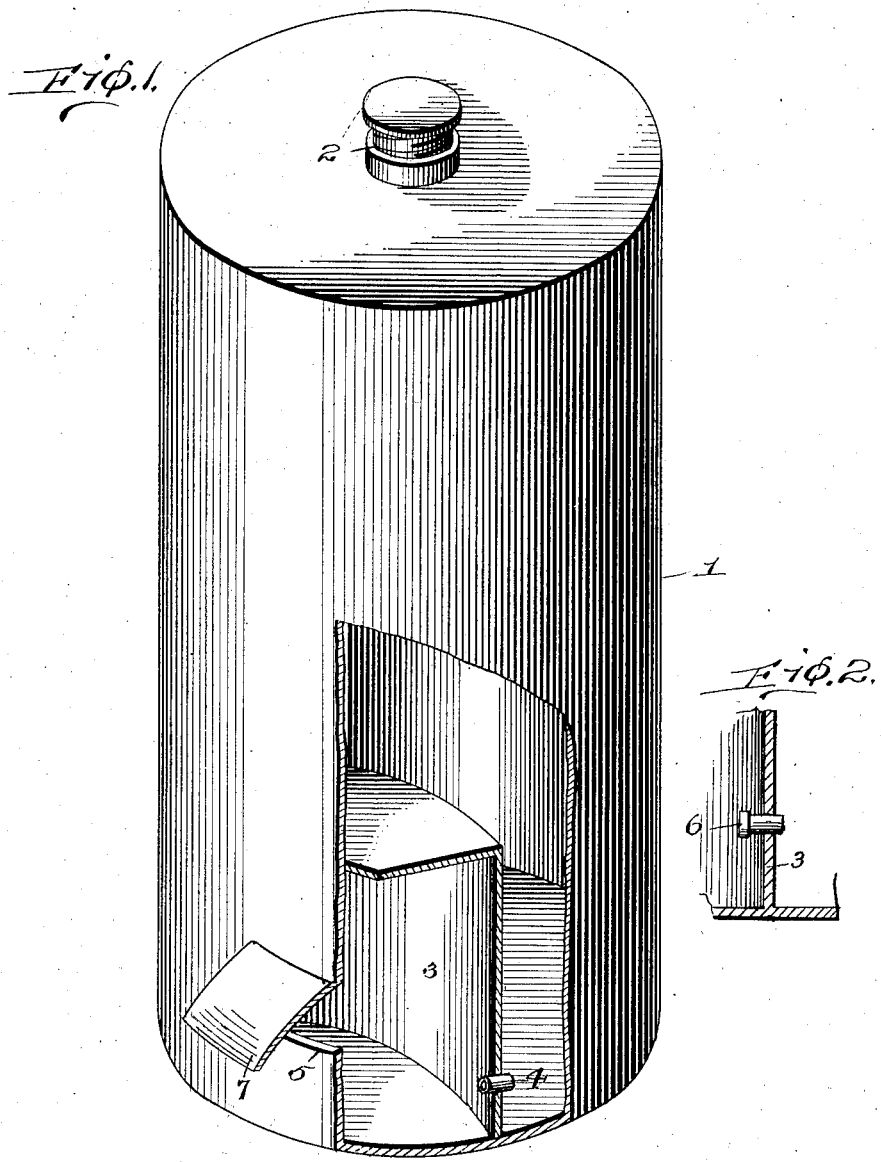

UNITED STATES PATENT OFFICE.

GEORGE WESLEY FLETCHER, OF LIMA, ILLINOIS.

AUTOMATIC HOG AND STOCK WATERING DEVICE.

1,025,461.  Specification of Letters Patent.  Patented May 7, 1912.

Application filed May 11, 1910.  Serial No. 560,620.

*To all whom it may concern:*

Be it known that I, GEORGE WESLEY FLETCHER, a citizen of the United States, residing at Lima, in the county of Adams and State of Illinois, have invented certain new and useful Improvements in Automatic Hog and Stock Watering Devices, of which the following is a specification.

This invention relates to improvements in stock-watering devices, especially for hogs.

It has for its object to secure the end in view in a simple and effective manner, and without waste of water at the drinking point, preventing thereby a hog wallow, as would otherwise be the case.

A further object of the invention is to obviate the roiling of the water in the fountain; and to provide for the ready cleaning and filling of the tank.

With the above and other objects in view, as will appear as the nature of the invention is better understood, the same consists in the novel construction and combination of parts of an automatic stock-watering device, as will be hereinafter fully described and claimed.

In the accompanying drawings forming a part of this specification, and in which like characters of reference indicate corresponding parts:—Figure 1 is a perspective view partly broken away for the purpose of exhibition of parts that would otherwise be hidden. Fig. 2 is a sectional detail view of a portion of the device.

In carrying out my invention, I provide a cylindrical receptacle or tank 1, preferably one that is upright, having a filling opening in its top; and when it is desired to clean or fill the tank, it is only necessary to remove the plug or closure 2 when the water contained therein will be allowed to escape or a fresh supply be furnished. In the bottom portion of the fountain or tank 1 is a sub-chamber 3 constituting a drinking compartment, adapted to contain water for the animal. An opening 5 is made laterally or in the side of the lower portion of the tank or receptacle 1 of sufficient size for the animal to insert its head to drink from the chamber 3 without allowing it to get its feet into the chamber which would allow the wasting of water at that point upon the ground and afford means for a hog wallow.

Communication is established between the tank or receptacle 1 and the drinking chamber 3, preferably by means of a section of pipe 4 in one wall of the latter chamber, a short distance above the bottom thereof, whereby as the animal consumes the water in the chamber 3 to a point below the pipe 4, the atmospheric pressure will automatically cause a flow of water through the pipe 4 and thus replenish the water supply in the chamber 3. It will be noted that by reason of the location of the pipe 4 at a point above the bottom of the tank, any extraneous substances that may be introduced into the drinking chamber by the animals will be prevented from passing into the tank 1, due to the well-known laws of specific gravity. When the tank is to be supplied with water, a plug 6 is inserted into the pipe 4 as shown in Fig. 2 thus closing communication between the tank 1 and inner chamber 3 and preventing waste or loss of water. As will be obvious, it will only be necessary to remove the plug or closure 2 of the opening in the top of the tank or receptacle 1, when it is desired to refill the storage-chamber.

As a means for preventing the animals from polluting the water in the receptacle 3, a hood 7 is provided which may be of the same material as the tank or otherwise, and is disposed at such angle relative to the plane of the side of the tank containing the supply opening 5 that the animals will only be able to insert their snouts or noses in taking the water, the lower edge of the hood being arranged about in a common plane with the corresponding edge of said opening to allow of the ready access of the snouts or noses into said opening as the snouts or noses are passed under said guard. The hood 7 also serves as a guard against the entrance into the water of dead leaves or other vegetable or refuse matter thereby preventing the fouling or polluting of the water from that source and accordingly aiding in always maintaining it in a thoroughly sanitary condition.

I claim:

A stock watering device consisting of a tank having an integral bottom and a feed opening and a portion extending over said opening, a cover for said tank having an opening, means for controlling said cover opening, a curved portion disposed eccentrically in said tank and engaging the bottom and wall thereof and provided with an opening above its lower edge and with a top engaging the tank wall, whereby a supplemental compartment is formed.

In testimony whereof I affix my signature in presence of two witnesses.

GEORGE WESLEY FLETCHER.

Witnesses:
 FLOYD W. MUNROE,
 CARL E. EPLER.